US009926629B2

(12) United States Patent
Beukenberg et al.

(10) Patent No.: US 9,926,629 B2
(45) Date of Patent: Mar. 27, 2018

(54) HOT GAS-GUIDED COMPONENT OF A TURBOMACHINE

(75) Inventors: Markus Beukenberg, Muehlheim (DE); Sharad Chandra, Koblenz (DE); Norbert Czech, Dorsten (DE); Roland Herzog, Juelich (DE)

(73) Assignee: MAN Diesel & Turbo SE, Augsburg (DE)

( * ) Notice: Subject to any disclaimer, the term of this patent is extended or adjusted under 35 U.S.C. 154(b) by 735 days.

(21) Appl. No.: 12/682,297

(22) PCT Filed: Oct. 7, 2008

(86) PCT No.: PCT/EP2008/008452
§ 371 (c)(1),
(2), (4) Date: Apr. 9, 2010

(87) PCT Pub. No.: WO2009/049796
PCT Pub. Date: Apr. 23, 2009

(65) Prior Publication Data
US 2010/0209733 A1  Aug. 19, 2010

(30) Foreign Application Priority Data
Oct. 9, 2007  (DE) .................. 10 2007 048 484

(51) Int. Cl.
| B32B 15/01 | (2006.01) |
| B32B 15/18 | (2006.01) |
| F01D 5/28 | (2006.01) |
| C23C 30/00 | (2006.01) |
| B32B 15/20 | (2006.01) |
| B23K 35/30 | (2006.01) |
| C22C 38/00 | (2006.01) |
| C22C 38/06 | (2006.01) |
| C22C 38/18 | (2006.01) |

(52) U.S. Cl.
CPC .............. *C23C 30/00* (2013.01); *B23K 35/30* (2013.01); *B32B 15/01* (2013.01); *B32B 15/015* (2013.01); *B32B 15/18* (2013.01); *B32B 15/20* (2013.01); *C22C 38/005* (2013.01); *C22C 38/06* (2013.01); *C22C 38/18* (2013.01); *C23C 30/005* (2013.01); *F01D 5/28* (2013.01); *F01D 5/286* (2013.01); *F01D 5/288* (2013.01); *Y10T 428/12931* (2015.01); *Y10T 428/12937* (2015.01); *Y10T 428/12944* (2015.01); *Y10T 428/12951* (2015.01); *Y10T 428/12972* (2015.01); *Y10T 428/12979* (2015.01)

(58) Field of Classification Search
CPC ....... B32B 15/01; B32B 15/015; B32B 15/18; B32B 15/20; B32B 2311/30; B32B 2603/00; C22C 38/005; C22C 38/06; C22C 38/18; C23C 30/00; C23C 30/005; Y10T 428/12944; Y10T 428/12937; Y10T 428/12951; Y10T 428/12972; Y10T 428/12979; Y10T 428/12931
USPC .................. 428/680, 679, 681, 685, 678
See application file for complete search history.

(56) References Cited

U.S. PATENT DOCUMENTS

| 3,542,530 | A |  | 11/1970 | Talboom |
| 3,676,085 | A |  | 2/1971 | Evans et al. |
| 3,754,903 | A |  | 8/1973 | Goward et al. |
| 3,928,026 | A |  | 12/1975 | Iecht et al. |
| 4,144,380 | A | * | 3/1979 | Beltran et al. ............... 428/679 |
| 4,585,481 | A | * | 4/1986 | Gupta et al. ............... 106/14.05 |
| 4,687,678 | A |  | 8/1987 | Lindblom |
| 5,240,491 | A |  | 8/1993 | Budinger et al. |
| 5,413,647 | A | * | 5/1995 | Ablett et al. ................. 148/539 |
| 5,510,080 | A | * | 4/1996 | Nishi et al. .................. 420/451 |
| 6,455,167 | B1 | * | 9/2002 | Rigney et al. ............. 428/472.2 |
| 6,485,025 | B1 |  | 11/2002 | Hammersley |
| 6,546,730 | B2 | * | 4/2003 | Johnson et al. ................ 60/752 |
| 2002/0141868 | A1 |  | 10/2002 | Lee |
| 2006/0059918 | A1 | * | 3/2006 | Caldwell et al. ............... 60/772 |
| 2006/0168965 | A1 | * | 8/2006 | Green et al. .................... 60/752 |

FOREIGN PATENT DOCUMENTS

| EP | 0 589 072 |  | 3/1994 |
| EP | 1111086 | * | 6/2001 |
| EP | 1 308 535 |  | 5/2003 |
| EP | 1 398 394 |  | 3/2004 |

OTHER PUBLICATIONS

Office Action dated Dec. 9, 2016 which issued in the corresponding German Patent Application No. 102007048484.6.

* cited by examiner

Primary Examiner — Michael E. La Villa
(74) Attorney, Agent, or Firm — Cozen O'Connor

(57) ABSTRACT

A hot-gas conducting component for a flow machine has a nickel-base wrought alloy as structural material and a hot gas-side lining made from the group of iron-chromium-aluminum-yttrium alloys and a flow machine having a component of this type.

5 Claims, No Drawings

HOT GAS-GUIDED COMPONENT OF A TURBOMACHINE

PRIORITY CLAIM

This is a U.S. national stage of application No. PCT/EP2008/008452, filed on Oct. 7, 2008. Priority is claimed on the following applications: Country: Germany, Application No.: 10 2007 048 484.6, Filed: Oct. 9, 2007 the content of which is incorporated here by reference.

FIELD OF THE INVENTION

The present invention is directed to a hot-gas conducting component of a flow machine and to a flow machine with a component of this type.

BACKGROUND OF THE INVENTION

Hot-gas conducting components of flow machines such as, e.g., combustion chamber linings, turbine inlet housings, hot gas ducts, and turbine blading must maintain their functionality under extreme thermal and mechanical loads. The components are continually exposed to oxidation and corrosion, and temperatures often exceed 1000° C. At the same time, compressed cooling air is only available to a limited extent.

With the exception of turbine blading, hot-gas conducting components which are exposed to high thermal loading but not to extreme mechanical loading are conventionally produced from solid-solution hardened, nickel-base wrought alloys. Alloys of this type are characterized by a high resistance to heat. However, nickel-base wrought alloys have the disadvantage of moderate oxidizability. To mitigate this disadvantage, hot-gas conducting components are usually provided with a ceramic-based coating on the hot gas side. But ceramic coatings of this type are costly to produce and apply.

SUMMARY OF THE INVENTION

It is the object of the present invention to provide a hot-gas conducting component of a flow machine with a hot gas-side lining which is improved over known ceramic coatings and to provide a flow machine with a component of this kind.

According to the invention, a hot-gas conducting component of a flow machine has, as a structural material and, therefore, as a supporting construction, a solid-solution hardened nickel-base wrought alloy and a hot gas-side lining made from the group of iron-chromium-aluminum-yttrium alloys.

Iron-chromium-aluminum-yttrium alloys, abbreviated as FeCrAlY alloys, have a very good resistance to oxidation. The temperature limit from the view point of the oxidation criterion is about 1200° C. Therefore, the operating temperature and stability of the hot-gas conducting components can be increased without the life of the structural material being disproportionately shortened by oxidation. The heat resistance of the FeCrAlY alloys can be called moderate. The moderate material properties of the two alloys—nickel-base wrought alloys, or Ni-base alloys for short, show a moderate resistance to oxidation, and FeCrAlY alloys have a moderate resistance to heat—are overcome by the combination according to the invention and by the construction according to the invention of the hot-gas conducting component due to the excellent resistance to oxidation and heat of the other respective alloy. In other words, the operating temperature and stability of the hot-gas conducting component according to the invention are improved by making effective use of the respective excellent property of the alloys.

In one embodiment, the hot gas-side lining is made from an ALUCHROM®-yttrium-hafnium alloy. In particular, the cyclic oxidation resistance of the hot gas-side lining can be increased by the active elements yttrium and hafnium.

The FeCrAlY alloy preferably has iron as a base element and comprises 16% to 24% chromium, 3% to 9% aluminum, 0.02% to 0.2% yttrium, up to 0.1% hafnium, up to 0.1% zirconium, and up to 0.1% metals from the group of rare earths, particularly lanthanides.

The hot gas-side lining can be applied by means of high-temperature soldering, welding, or cladding, particularly roll bonding cladding.

In one embodiment, the structural material of the hot-gas conducting component is sandwiched between the hot gas-side lining and a cooling air-side coating which is preferably made of an alloy from the group of nickel-cobalt-iron-chromium-aluminum-yttrium (MCrAlY) alloys.

A flow machine according to the invention has at least one hot-gas conducting component which has a structural material comprising a solid-solution hardened nickel-base wrought alloy which is provided with a hot gas-side lining made from the group of iron-chromium-aluminum-yttrium alloys.

DETAILED DESCRIPTION OF THE PRESENTLY PREFERRED EMBODIMENTS

Preferred embodiments of the invention are described more fully in the following.

According to the invention, a hot-gas conducting component of a flow machine, particularly a gas turbine, is constructed as a composite material comprising a solid-solution hardened nickel (Ni) base wrought alloy and an oxidation-resistant ferritic iron base alloy, particularly an FeCrAlY alloy. The Ni base wrought alloy forms the supporting construction and structural material of the component, and the FeCrAlY alloy is applied to the structural material as a hot gas-side lining. Within the meaning of the invention, "hot gas side" means that the lining is applied to an inner surface of the component facing the hot gases. In a corresponding manner, "cooling air side" within the meaning of the invention means a coating is arranged on an outer surface of the component facing the cooling air.

For example, a hot-gas conducting component of a gas turbine is the Y-branch pipe which serves as a hot-gas guiding duct between the combustion chambers and the turbine blading and guides the hot gases from the combustion chamber to the first turbine stage. Other hot-gas conducting components are, for example, combustion chamber linings and turbine inlet housings.

A preferred material from the group of FeCrAlY alloys is an aluminum-chromium-yttrium-hafnium alloy, abbreviated ALUCHROM®-YHf alloy.

Aside from the active element yttrium (Y) and hafnium (Hf), additional active elements such as, e.g., zirconium (Zr), can be mixed in with the FeCrAlY alloy to increase the cyclic oxidation resistance.

An FeCrAlY alloy having iron (Fe) as base element and comprising 16% to 24% chromium (Cr), 3% to 9% aluminum (Al), 0.02% to 0.2% yttrium (Y), up to 0.1% hafnium (Hf), up to 0.1% zirconium (Zr), and up to 0.1% metals from the group of rare earths (RE) is particularly preferable.

Lanthanides or lanthanoids (La), e.g., cerium (Ce), praseodymium (Pr), neodymium (Nd), and promethium (Pm), are mentioned in particular as examples from the group of rare earths.

The FeCrAlY alloys are applied to the structural material by means of known methods of high-temperature soldering, welding, or cladding and roll bonding cladding. To prevent interdiffusion between the structural material and the lining, a diffusion barrier, e.g., based on the Al—O—N system, can be used.

The use of the FeCrAlY alloy as lining is not limited to the hot gas side of the components; rather, it is also contemplated to construct the hot-gas conducting component in a sandwich-type manner. In so doing, the structural material of solid-solution hardened Ni base wrought alloy constitutes the supporting structural core which is arranged between a hot gas-side lining and a cooling air-side coating based on the above-described FeCrAlY alloys.

The disclosure relates to a hot-gas conducting component for a flow machine with a nickel base wrought alloy as structural material and a hot gas-side lining from the group of iron-chromium-aluminum-yttrium alloys and to a flow machine with a component of this type.

The invention is not limited by the embodiments described above which are presented as examples only but can be modified in various ways within the scope of protection defined by the appended patent claims.

The invention claimed is:

1. A heat and oxidation resistant hot gas conducting component of a flow machine comprising:
   a solid-solution hardened nickel-base wrought alloy as structural material; and
   a hot gas-side lining applied directly on the structural material, said hot gas-side lining consisting of a ferritic, body-centered cubic iron-based iron-chromium-aluminum-yttrium-hafnium alloy, for direct hot gas conducting contact with the hot gas in the flow machine, and wherein said alloy of the hot gas-side lining consists of 16% to 24% w/w chromium, 3% to 9% w/w aluminum, 0.02% to 0.2% w/w yttrium, up to 0.1% w/w hafnium, balance consisting of iron, up to 0.1% w/w zirconium and up to 0.1% w/w of metals selected from the group of lanthanides; the hot gas conducting component being selected from the group consisting of combustion chamber linings, turbine inlet housings and hot gas ducts.

2. The hot gas conducting component according to claim 1, wherein said hot gas-side lining is applied directly by means of high-temperature soldering, welding, or cladding.

3. The hot gas conducting component according to claim 1, additionally comprising a cooling air-side coating applied to said structural material.

4. The hot gas conducting component according to claim 3, wherein said cooling air-side coating is an alloy selected from the group of MCrAlY alloys wherein M represents one or more of nickel, cobalt and iron.

5. A flow machine having a hot gas conducting component according to claim 1.

* * * * *